United States Patent
Carter et al.

(10) Patent No.: US 9,909,451 B2
(45) Date of Patent: Mar. 6, 2018

(54) BEARING ASSEMBLY FOR SUPPORTING A ROTOR SHAFT OF A GAS TURBINE ENGINE

(71) Applicant: General Electric Company, Schenectady, NY (US)

(72) Inventors: Bruce Alan Carter, West Chester, OH (US); Ravindra Shankar Ganiger, Bangalore (IN); Bhaskar Nanda Mondal, Bangalore (IN); Jacob Patrick Miller, Sharonville, OH (US); Sivakumar Mahesh, Bangalore (IN); Kevin L. Kirkeng, Milford, OH (US); Veeraraju Vanapalli, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/198,776

(22) Filed: Jun. 30, 2016

(65) Prior Publication Data

US 2017/0009603 A1    Jan. 12, 2017

(30) Foreign Application Priority Data

Jul. 9, 2015    (IN) .......................... 3524/CHE/2015

(51) Int. Cl.
*F01D 25/16*    (2006.01)
*F16C 35/073*    (2006.01)
(Continued)

(52) U.S. Cl.
CPC .......... *F01D 25/164* (2013.01); *F01D 5/027* (2013.01); *F01D 21/045* (2013.01); *F02C 3/04* (2013.01);
(Continued)

(58) Field of Classification Search
CPC ........ F16C 19/16; F16C 33/30; F16C 35/073; F16C 2360/23; F01D 25/164; F01D 5/027;
(Continued)

(56) References Cited

U.S. PATENT DOCUMENTS

| 2,445,661 | A | 7/1948 | Constant et al. |
| 4,289,360 | A | 9/1981 | Zirin |

(Continued)

FOREIGN PATENT DOCUMENTS

| EP | 0669450 A1 | 8/1995 |
| EP | 1013896 A2 | 6/2000 |

(Continued)

OTHER PUBLICATIONS

European Search Report issued in connection with corresponding EP Application No. 16178645.4 dated Nov. 25, 2016.
(Continued)

*Primary Examiner* — Marcus Charles
(74) *Attorney, Agent, or Firm* — General Electric Company; Pamela A. Kachur

(57) ABSTRACT

In one aspect, a bearing assembly for supporting a rotor shaft relative to a support structure of a gas turbine engine may generally include a bearing including an outer race and an inner race, an outer bearing housing configured to extend radially between the outer race of the bearing and the support structure of the gas turbine engine and an inner bearing support configured to extend radially between the inner race of the bearing and the rotor shaft. In addition, the outer bearing housing and the inner bearing support each include at least one radially extending spring arm such that the outer bearing housing and the inner bearing support collectively form two springs coupled in series between the support structure and the rotor shaft.

17 Claims, 4 Drawing Sheets

(51) Int. Cl.
| | |
|---|---|
| *F16C 33/30* | (2006.01) |
| *F02C 3/04* | (2006.01) |
| *F02C 7/06* | (2006.01) |
| *F01D 5/02* | (2006.01) |
| *F01D 21/04* | (2006.01) |
| *F16C 27/04* | (2006.01) |
| *F16C 19/16* | (2006.01) |

(52) U.S. Cl.
CPC ............... *F02C 7/06* (2013.01); *F16C 27/04* (2013.01); *F16C 33/30* (2013.01); *F16C 35/073* (2013.01); F05D 2220/32 (2013.01); F05D 2240/24 (2013.01); F05D 2240/52 (2013.01); F05D 2240/60 (2013.01); *F16C 19/16* (2013.01); *F16C 2360/23* (2013.01); Y02T 50/671 (2013.01)

(58) Field of Classification Search
CPC .... F01D 21/045; F01D 25/166; F01D 25/243; F02C 3/04; F02C 7/06; F05D 2220/32; F05D 2240/24; F05D 2240/52; F05D 2240/60; Y02T 50/671
USPC ....... 384/126, 129, 438, 440, 495, 535, 537, 384/559, 581, 585, 627; 415/174.2, 229
See application file for complete search history.

(56) References Cited

U.S. PATENT DOCUMENTS

| | | | |
|---|---|---|---|
| 4,460,284 A | 7/1984 | Lauterbach et al. | |
| 4,751,816 A * | 6/1988 | Perry ..................... | F02K 3/072 416/129 |
| 4,872,767 A | 10/1989 | Knapp | |
| 5,052,828 A | 10/1991 | Ciokajlo et al. | |
| 5,307,622 A * | 5/1994 | Ciokajlo ................ | F02C 3/067 415/65 |
| 5,791,789 A | 8/1998 | Van Duyn et al. | |
| 5,974,782 A | 11/1999 | Gerez | |
| 6,240,719 B1 | 6/2001 | Vondrell et al. | |
| 6,402,469 B1 | 6/2002 | Kastl et al. | |
| 6,413,046 B1 | 7/2002 | Penn et al. | |
| 6,428,269 B1 | 8/2002 | Boratgis et al. | |
| 6,439,772 B1 | 8/2002 | Ommundson et al. | |
| 6,443,698 B1 | 9/2002 | Corattiyil et al. | |
| 6,447,248 B1 | 9/2002 | Kastl et al. | |
| 6,491,497 B1 | 12/2002 | Allmon et al. | |
| 6,540,483 B2 | 4/2003 | Allmon et al. | |
| 6,558,041 B2 | 5/2003 | Laos | |
| 6,619,030 B1 * | 9/2003 | Seda ....................... | F01D 9/041 60/226.1 |
| 6,622,473 B2 * | 9/2003 | Becquerelle ............ | F01D 15/12 60/226.1 |
| 6,679,045 B2 | 1/2004 | Karafillis et al. | |
| 6,763,652 B2 * | 7/2004 | Baughman .............. | F02C 3/067 415/199.5 |
| 6,763,653 B2 * | 7/2004 | Orlando .................. | F02C 3/067 60/226.1 |
| 6,763,654 B2 * | 7/2004 | Orlando .................. | F01D 1/24 415/69 |
| 6,783,319 B2 * | 8/2004 | Doerflein ................ | F01D 21/045 384/495 |
| 6,821,083 B2 | 11/2004 | Lathrop et al. | |
| 6,846,158 B2 * | 1/2005 | Hull ....................... | F01D 25/164 384/99 |
| 7,097,413 B2 | 8/2006 | VanDuyn | |
| 7,340,882 B2 | 3/2008 | Lapergue et al. | |
| 7,384,199 B2 | 6/2008 | Allmon et al. | |
| 7,513,103 B2 * | 4/2009 | Orlando .................. | F01D 1/26 415/9 |
| 7,634,913 B2 | 12/2009 | Singh et al. | |
| 7,648,278 B2 | 1/2010 | Stout et al. | |
| 7,716,914 B2 * | 5/2010 | Schilling ................ | F02C 3/067 60/268 |
| 7,797,922 B2 | 9/2010 | Eleftheriou et al. | |
| 7,832,193 B2 * | 11/2010 | Orlando .................. | F01D 15/12 415/61 |
| 7,841,165 B2 | 11/2010 | Orlando et al. | |
| 7,882,693 B2 * | 2/2011 | Schilling ................ | F02C 3/107 60/204 |
| 7,909,514 B2 | 3/2011 | Plona | |
| 7,926,259 B2 * | 4/2011 | Orlando .................. | F02C 7/36 60/204 |
| 7,966,806 B2 * | 6/2011 | Henry ..................... | F02C 3/067 60/226.1 |
| 8,182,156 B2 | 5/2012 | Kinnaird et al. | |
| 8,205,432 B2 * | 6/2012 | Sheridan ................ | F02C 7/36 60/226.1 |
| 8,322,038 B1 | 12/2012 | Heidari et al. | |
| 8,727,632 B2 | 5/2014 | Do et al. | |
| 8,821,029 B2 | 9/2014 | Antunes et al. | |
| 8,845,277 B2 | 9/2014 | Davis | |
| 9,447,817 B2 * | 9/2016 | Gallimore ............... | F01D 25/16 |
| 2003/0210979 A1 * | 11/2003 | Doerflein .............. | F01D 21/045 415/1 |
| 2006/0204153 A1 | 9/2006 | Alam et al. | |
| 2007/0031078 A1 | 2/2007 | Hackett | |
| 2013/0022448 A1 | 1/2013 | Jadczak et al. | |
| 2013/0315523 A1 | 11/2013 | Bedenk | |

FOREIGN PATENT DOCUMENTS

| | | | | |
|---|---|---|---|---|
| EP | 1574685 A1 * | 9/2005 | ............... | F01D 5/03 |
| EP | 1626188 A2 | 2/2006 | | |
| EP | 2065569 A2 | 6/2009 | | |
| EP | 2149681 A2 | 2/2010 | | |
| EP | 2194238 A1 | 6/2010 | | |
| EP | 2339131 A1 | 6/2011 | | |
| EP | 2667046 A2 | 11/2013 | | |
| WO | 2015069353 A2 | 5/2015 | | |

OTHER PUBLICATIONS

European Search Report issued in connection with related EP Application No. 16176055.8 dated Dec. 9, 2016.
GE Related Case Form.
Machine translation of Japanese Office Action issued in connection with corresponding JP Application No. 2016131189 dated Jun. 13, 2017.
Machine translation of Japanese Notice of Allowance issued in connection with corresponding JP Application No. 2016131189 dated Jul. 11, 2017.
Bruce Alan Carter et al., filed Jul. 1, 2016, U.S. Appl. No. 15/200,008.

* cited by examiner

BEARING ASSEMBLY FOR SUPPORTING A ROTOR SHAFT OF A GAS TURBINE ENGINE

FIELD OF THE INVENTION

The present subject matter relates generally to gas turbine engines and, more particularly, to a bearing assembly for supporting a rotor shaft of a gas turbine engine.

BACKGROUND OF THE INVENTION

Gas turbine engines typically include a rotor assembly, a compressor, and a turbine. The rotor assembly includes a fan that has an array of fan blades extending radially outward from a rotor shaft. The rotor shaft transfers power and rotary motion from the turbine to both the compressor and the fan and is supported longitudinally using a plurality of bearing assemblies. Additionally, the rotor assembly has an axis of rotation that passes through a rotor center of gravity. Known bearing assemblies include rolling elements and a paired race, wherein the rolling elements are supported within the paired race. To maintain a rotor critical speed margin, the rotor assembly is typically supported on three bearing assemblies, one of which is a thrust bearing assembly and two of which are roller bearing assemblies. The thrust bearing assembly supports the rotor shaft and minimizes axial and radial movement of the rotor shaft assembly. The remaining roller bearing assemblies support radial movement of the rotor shaft.

During operation of the engine, a fragment of a fan blade may become separated from the remainder of the blade. Accordingly, a substantial unbalanced rotary load may be created within the damaged fan and must be carried substantially by the fan shaft bearings, the fan bearing supports, and the fan support frames.

To minimize the effects of potentially damaging abnormal unbalanced loads, known gas turbine engines include support components for the fan rotor support system that are sized to provide additional strength. However, increasing the strength of the support components undesirably increases an overall weight of the engine and decreases an overall efficiency of the engine when the engine is operated without substantial rotor imbalances.

Other known engines include a bearing support that includes a mechanically weakened section, or primary fuse, that decouples the fan rotor from the fan support system. During such events, the fan shaft seeks a new center of rotation that approximates that of its unbalanced center for gravity. This fuse section, in combination with a rotor clearance allowance, is referred to as a load reduction device, or LRD. The LRD reduces the rotating dynamic loads in the fan support system.

After the primary fuse fails, the pitching fan rotor often induces a large moment to the next closest bearing. In many configurations, the next closest bearing is known as the number two bearing position. The moment induced to the number two bearing induces high bending and shear loads to the fan rotor locally. To relieve the high shear stresses, the radial stiffness of the number two bearing position is often softened or reduced. However, to accommodate the axial loading transmitted through the engine, the number two bearing support must also provide high axial stiffness.

Current bearing assemblies are available that provide for a softened radial stiffness while still providing substantially high axial stiffness. However, as the bypass ration and thermal efficiency of modern gas turbine engines are increased, the resulting axial and radial loads transmitted through such engines correspondingly increase. Thus, current bearing assemblies must be redesigned to accommodate such increased turbine loads.

Accordingly, a bearing assembly that provides improved radial stiffness and/or axial stiffness to assist in accommodating the increased radial and/or axial loads of modern gas turbine engines would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a bearing assembly for supporting a rotor shaft relative to a support structure of a gas turbine engine. The bearing assembly may generally include a bearing including an outer race and an inner race and an outer bearing housing configured to extend radially between the outer race and the support structure of the gas turbine engine. In addition, the bearing assembly may include an inner bearing support extending radially between an outer support end configured to be disposed adjacent to the inner race of the bearing and an inner support end configured to be rotatably coupled to the rotor shaft. The inner bearing support may include a first spring arm and a second spring arm extending radially between the inner and outer support ends. The inner bearing support may also include a stiffening rib separating the first spring arm from the second spring arm such that the first spring arm extends radially outwardly from the stiffening rib towards the outer support end and the second spring arm extends radially inwardly from stiffening rib towards the inner support end.

In another aspect, the present subject matter is directed to a bearing assembly for supporting a rotor shaft relative to a support structure of a gas turbine engine. The bearing assembly may generally include a bearing including an outer race and an inner race and an outer bearing housing extending radially from an inner housing end configured to be disposed adjacent to the outer race of the bearing and an outer housing end configured to be coupled to the support structure of the gas turbine. The outer bearing housing may include a first spring arm and a second spring arm extending between the inner and outer housing ends. The outer bearing housing may also include a stiffening ring separating the first spring arm from the second spring arm such that the first spring arm extends between the stiffening rib and the outer housing end and the second spring arm extends between stiffening rib and the inner housing end. In addition, the bearing assembly may include an inner bearing support configured to extend radially between the inner race of the bearing and the rotor shaft.

In a further aspect, the present subject matter is directed to a bearing assembly for supporting a rotor shaft relative to a support structure of a gas turbine engine. The bearing assembly may generally include a bearing including an outer race and an inner race, an outer bearing housing configured to extend radially between the outer race of the bearing and the support structure of the gas turbine engine and an inner bearing support configured to extend radially between the inner race of the bearing and the rotor shaft. In addition, the outer bearing housing and the inner bearing support each include at least one radially extending spring arm such that the outer bearing housing and the inner bearing support collectively form two springs coupled in series between the support structure and the rotor shaft.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
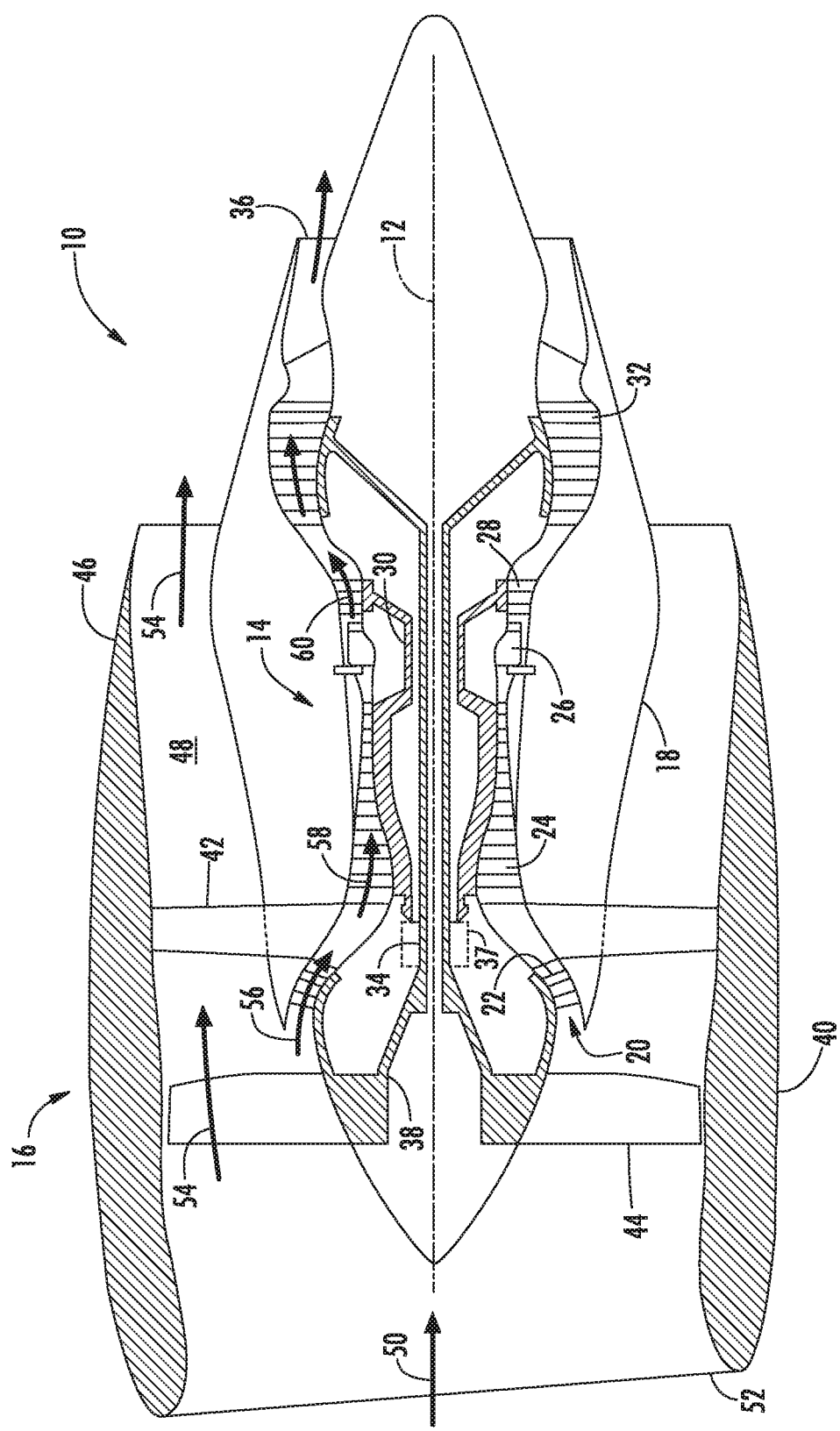
FIG. 1 illustrates a cross-sectional view of one embodiment of a gas turbine engine that may be utilized within an aircraft in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved bearing assembly for supporting a rotor shaft of a gas turbine engine relative to corresponding support structure of the engine. Specifically, in several embodiments, the bearing assembly may include an outer bearing housing, an inner bearing support and a bearing coupled between the outer bearing housing and the inner bearing support such that the outer bearing housing extends radially outwardly from the bearing towards the support structure of the engine and the inner bearing support extends radially inwardly from the bearing towards the rotor shaft. As will be described below, the inner bearing support may have a "double cone" shaft configuration formed by first and second spring arms extending radially and axially between opposed ends of the inner bearing support and a corresponding axial stiffening rib of the inner bearing support. The spring arms may generally allow for the inner bearing support to have a relatively low radial stiffness while the axial stiffening rib may provide the required axial stiffness for maintaining desired rotor-stator clearances.

Additionally, as will be described below, the outer bearing housing may include a similar "double cone" configuration to that of the inner bearing support. For instance, the outer bearing housing may also include first and second spring arms extending radially and axially between opposed ends of the outer bearing housing and a corresponding axial stiffening ring of the housing. As a result, the outer bearing housing and the inner bearing support may generally form two "springs" coupled in series between the support structure and the rotor shaft. Such a configuration may allow for a significant reduction in the radial stiffness of the disclosed bearing assembly, thereby allowing the assembly to reduce the radial loads transmitted to other adjacent engine components.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. Additionally, a bearing support structure 108 (FIG. 2) may extend radially inwardly from the outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
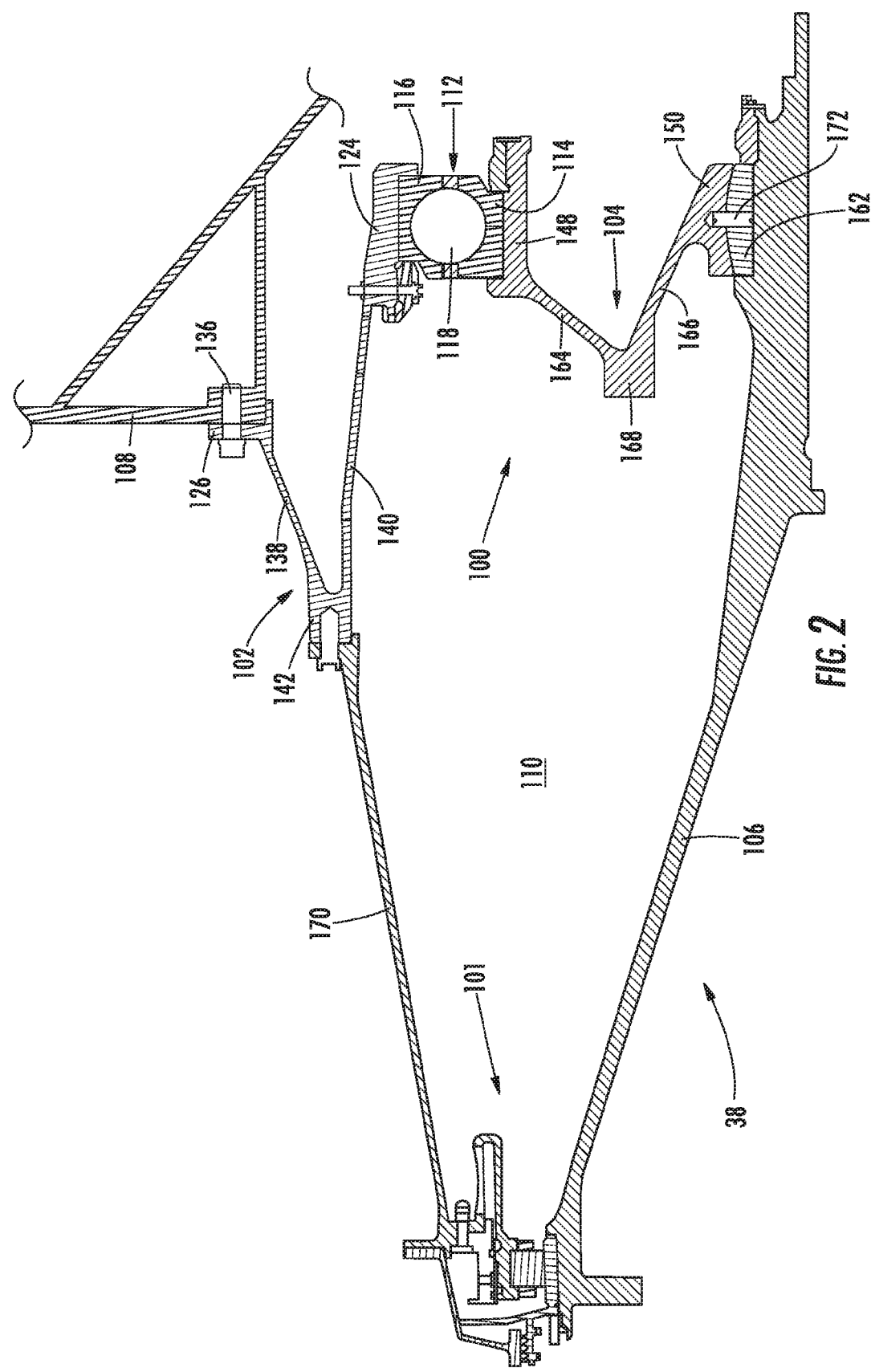
FIG. 2 illustrates a cross-sectional view of one embodiment of a bearing assembly for supporting a rotor shaft of a gas turbine engine relative to corresponding support structure of the engine in accordance with aspects of the present subject matter.
Figure 3:
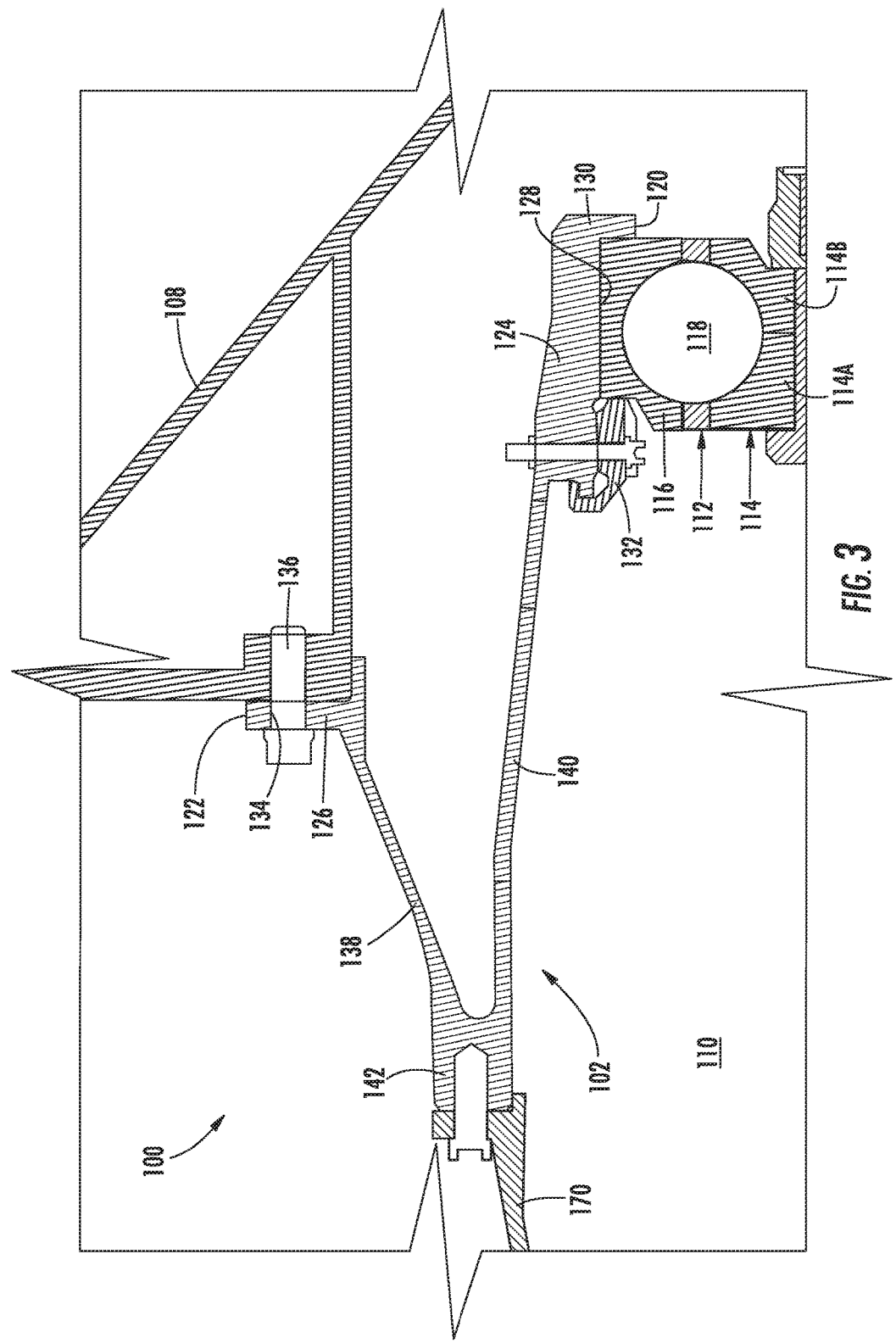
FIG. 3 illustrates a partial cross-sectional view of the bearing assembly shown in FIG. 2, particularly illustrating an outer bearing housing of the bearing assembly.
Figure 4:
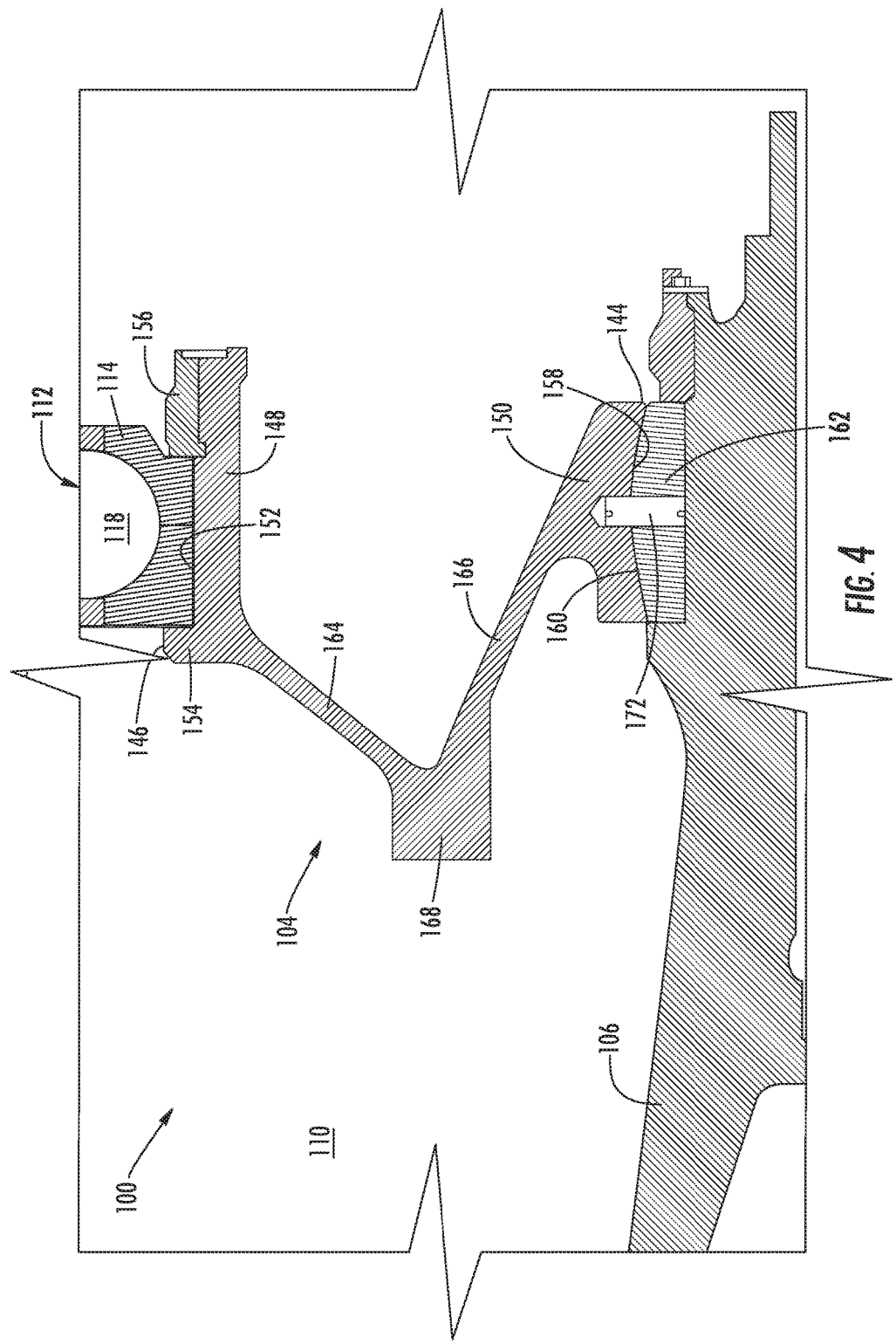
FIG. 4 illustrates another partial cross-sectional view of the bearing assembly shown in FIG. 2, particularly illustrating an inner bearing support of the bearing assembly.

Referring now to FIGS. 2-4, various cross-sectional views of one embodiment of a bearing assembly 100 suitable for use within a gas turbine engine 10 are illustrated in accordance with aspects of the present subject matter. Specifically, FIG. 2 illustrates a cross-sectional view of the bearing assembly 100 installed relative to the fan rotor assembly 38 of the gas turbine engine 10. FIG. 3 illustrates a partial cross-sectional view of the bearing assembly 100 shown in FIG. 2, particularly illustrating an outer bearing housing 102 of the bearing assembly 100. Additionally, FIG. 4 illustrates another partial cross-sectional view of the bearing assembly 100 shown in FIG. 2, particularly illustrating an inner bearing support 104 of the bearing assembly 100.

As shown in FIG. 2, the rotor assembly 38 may generally include a rotor shaft 106 (e.g., shaft 34 shown in FIG. 1) configured to support an array of fan blades 44 (FIG. 1) of the rotor assembly 38 extending radially outwardly from a corresponding rotor disc (not shown). As is generally understood, the rotor shaft 106 may be supported within the engine 10 through one or more axially spaced bearing assemblies 100, 101 configured to rotationally support the rotor shaft 42 relative to a structural support frame 108 of the gas turbine engine 10. For instance, as shown in FIG. 2, a first bearing assembly 100 may be coupled between the rotor shaft 106 and the support frame 108 at a location axially aft from a second bearing assembly 101. In several embodiments, the first bearing assembly 100 may be located at the number two bearing position within the engine 10 and may correspond to a fan thrust bearing whereas the second bearing assembly 101 may be located at the number one bearing position within the engine 10 and may correspond to a roller bearing assembly.

As shown in the illustrated embodiment, the first bearing assembly 100 (simply referred to hereinafter as the bearing assembly 100) may generally be positioned within an annular, sealed compartment 110 of the engine 10 defined between the rotor shaft 106 and the support frame 108. In several embodiments, the bearing assembly 100 may include a bearing 112, an outer bearing housing 102 extending radially between the bearing 112 and the support frame 108 and an inner bearing support 104 extending radially between the bearing 112 and the rotor shaft 106. As shown in FIG. 2, the bearing 112 may generally include an inner race 114, an outer race 116 positioned radially outwardly from the inner race 114 and a plurality of rolling elements 118 (only one of which is shown) disposed between the inner and outer races 114, 116. The rolling elements 118 may generally correspond to any suitable bearing elements, such as balls or rollers.

It should be appreciated that the bearing 112 may generally have any suitable bearing configuration that allows it to function as described herein. For instance, in one embodiment, the inner race 114 may have a split race configuration such that the inner race 114 includes both a forward inner race portion 114A (FIG. 3) and an aft inner race portion 114B (FIG. 3). Moreover, in one embodiment, in addition to a split inner race (or as an alternative thereto), the outer race 116 may also have a split race configuration.

As shown in FIGS. 2 and 3, the outer bearing housing 102 may generally extend radially between an inner housing end 120 (FIG. 3) and an outer housing end 122 (FIG. 3), with the outer bearing housing 102 including an outer bearing ring 124 disposed at the inner housing end 120 and a mounting flange 126 disposed at the outer housing end. In general, the outer bearing ring 124 may be configured to interface with and/or be coupled to the outer race 116 of the bearing 112. For example, as particularly shown in FIG. 3, the outer bearing ring 124 may define an outer circumferential bearing surface 128 configured to contact or otherwise be disposed adjacent to the outer race 116 around the entire outer circumference of the bearing 112.

In addition, the outer bearing ring 124 may include or may be associated with suitable retention features for axially retaining the bearing 112 relative to the outer bearing housing 102. For instance, as shown in FIG. 3, the outer bearing ring 124 may include a lip 130 configured to extend radially along the aft side of the outer race 116 so as to prevent movement of the bearing 112 in the axially aft direction relative to the outer bearing housing 102. Moreover, a retention feature(s) may also be provided along the forward side of the outer race 116. For example, as shown in FIG. 3, in one embodiment, the forward retention feature may correspond to a spanner nut 132 coupled to the outer bearing ring 124 via a suitable bolt or other fastener.

As shown in FIGS. 2 and 3, in several embodiments, the outer bearing housing 102 may be coupled to the support frame 108 of the engine 10 via the mounting flange 126 disposed at the outer housing end 122 of the housing 102. In general, the mounting flange 126 may be configured to be coupled to the support frame 108 using any suitable attachment means. For instance, as shown in the illustrated embodiment, the mounting flange 126 may define a plurality of axially extending bolt holes 134 (FIG. 3) (only one of which is shown) for receiving bolts 136 or other suitable fasteners configured to couple the mounting flange 126 to the support frame 108. In other embodiments, the outer bearing housing 102 may be configured to be coupled to the support frame 108 using any other suitable attachment means.

Additionally, as shown in FIGS. 2 and 3, the outer bearing housing 102 may also include first and second spring arms 138, 140 extending between the first and second housing ends 120, 122. Specifically, as shown in FIG. 3, the first spring arm 138 may be configured to extend radially inwardly and axially forward from the mounting flange 126 to an axial stiffening ring 142 of the outer bearing housing 102. Additionally, the second spring arm 140 may be configured to extend radially inwardly and axially aft from the axial stiffening ring 142 to the outer bearing ring 124. In general, the spring arms 138, 140 may be configured to allow the outer bearing housing 102 to function as a spring-like member in the radial direction, thereby providing for a reduction in the radial stiffness of the outer bearing housing 102. For instance, one or both of the spring arms 138, 140 may be configured to radially deform upon the application of radial loads through the outer bearing housing 102, thereby allowing the housing 102 to accommodate radial loads transmitted through the bearing assembly 100.

Moreover, the stiffening ring 142 provided between the first and second spring arms 138, 140 may generally be configured to provide increased axial stiffness to the outer bearing housing 102. As a result, the stiffening ring 142 may serve to reduce the axial deflection of the outer bearing housing 102 upon the application of axial loads. As shown in FIGS. 2 and 3, in one embodiment, the spring arms 138, 140 may be configured to extend in the axial direction relative to the inner and outer housing ends 120, 122 of the outer bearing housing 102 such that the axial stiffening ring 142 is located axially forward of both the mounting flange 126 and the outer bearing ring 124. However, in other embodiments, the stiffening ring 142 may have any other suitable axial positioning relative to the mounting flange 126 and/or the outer bearing ring 124.

It should be appreciated that, in addition to the stiffening ring 142, the second spring arm 140 may also be configured to provide additional axial stiffness to the outer bearing housing 102. Specifically, as shown in FIG. 3, although the second spring arm 140 extends slightly in the radial direction between the stiffening ring 142 and the outer bearing ring 124, the spring arm 140 extends primarily in the axial direction. As such, the combination of the stiffening ring 142 and the second spring arm 140 may serve to provide increased axial stiffness to the outer bearing housing 102.

Additionally, as shown in FIGS. 2 and 4, the inner bearing support 104 may generally extend radially between an inner support end 144 (FIG. 4) and an outer support end 146 (FIG. 4), with the inner bearing support 104 including an inner bearing ring 148 disposed at the outer support end 146 and an inner mounting ring 150 disposed at the inner support end 144. In general, the inner bearing ring 148 may be configured to interface with and/or be coupled to the inner race 114 of the bearing 112. For example, as particularly shown in FIG. 4, the inner bearing ring 148 may define an inner circumferential bearing surface 152 configured to contact or otherwise be disposed adjacent to the outer race 114 around the entire inner circumference of the bearing 112.

In addition, the inner bearing ring 148 may include or may be associated with suitable retention features for axially retaining the bearing 112 relative to the inner bearing support 104. For instance, as shown in FIG. 4, the inner bearing ring 148 may include a lip 154 configured to extend radially along the forward side of the inner race 114 so as to prevent movement of the bearing 112 in the axially forward direction relative to the inner bearing support 104. Moreover, a retention feature(s) may also be provided along the aft side of the inner race 114. For example, as shown in FIG. 4, in one embodiment, the aft retention feature may correspond to a spanner nut 156 coupled to the inner bearing support 104.

As shown in FIGS. 2 and 4, in several embodiments, the inner bearing support 104 may be configured to be rotatably coupled to the rotor shaft 106 via the mounting ring 150 disposed at the inner support end 144 of the support 104. For example, as particularly shown in FIG. 4, the mounting ring may define an inner surface 158 configured to interface with an outer face 160 of a mounting race 162 rotatably coupled to the rotor shaft 106. Specifically, in several embodiments, the inner surface 158 of the mounting ring 150 and the outer face 160 of the mounting race 162 may be contoured such that a sliding interface is defined between the mounting ring 150 and the mounting race 162. For instance, in one embodiment, both the inner surface 158 of the mounting ring 150 and the outer face 160 of the mounting race 162 may define mating spherically-shaped surfaces. As will be described below, the mounting race 162 may be coupled to the mounting ring 150 via a pinned connection that is configured to fail if an excessive moment load is applied through the rotor shaft 106, at which point the sliding interface defined between the mounting race 162 and the inner bearing support 104 may allow the rotor shaft 106 to pitch in order to adjust its center of rotation.

Additionally, as shown in FIGS. 2 and 4, the inner bearing support 104 may also include first and second spring arms 164, 166 extending between the first and second support ends 144, 146. Specifically, as shown in FIG. 4, the first spring arm 164 may be configured to extend radially inwardly and axially forward from the inner bearing ring 148 to an axial stiffening rib 168 of the inner bearing support 104. Additionally, the second spring arm 156 may be configured to extend radially inwardly and axially aft from the axial stiffening rib 168 to the mounting ring 150. In general, the spring arms 164, 166 may be configured to allow the inner bearing support 104 to function as a spring-like member in the radial direction, thereby providing for a reduction in the radial stiffness of the inner bearing support 104. For instance, the spring arms 164, 166 may be configured to radially deform upon the application of radial loads through the inner bearing support 104, thereby allowing the support 104 to accommodate radial loads transmitted through the bearing assembly 100.

Moreover, the stiffening rib 168 provided between the first and second spring arms 164, 166 may generally be configured to provide increased axial stiffness to the inner bearing support 104. As a result, the stiffening rib 168 may serve to reduce the axial deflection of the inner bearing support 104 upon the application of axial loads. As shown in FIGS. 2 and 4, in one embodiment, the spring arms 164, 166 may be configured to extend in the axial direction relative to the inner and outer support ends 144, 146 of the inner bearing support 104 such that the axial stiffening rib 168 is located axially forward of both the inner bearing ring 148 and the mounting ring 150. However, in other embodiments, the stiffening rib 168 may have any other suitable axial positioning relative to the inner bearing ring 148 and/or the mounting ring 150.

It should be appreciated that, due to the configurations of the outer bearing housing 102 and the inner bearing support 104, disclosed bearing assembly 100 generally has a dual-spring configuration, with two "springs" being coupled in series between the rotor shaft 106 and the support frame 108. Specifically, the combination of the spring arms 138, 140 of the outer bearing housing 102 and the spring arms 164, 166 of the inner bearing support 104 may allow for the entire bearing assembly 100 to have a relatively low radial stiffness such that the center of rotation of the rotor shaft 106 approaches the new rotor center of gravity in the event of an unbalance within the engine 10, thereby providing for reduced load transmission through the assembly 100. In addition, the configurations of the outer bearing housing 102 and the inner bearing support 104 may also provide the requisite axial stiffness for maintaining low axial deflections during loading, thereby allowing the disclosed bearing assembly 100 to assist in achieving the desired rotor-stator clearance(s).

It should also be appreciated that, as indicated above, the bearing assembly 100 may also include or may be associated with suitable load reduction features for reducing the rotating dynamic loads of the fan support system. Specifically, in several embodiments, the axial stiffening ring 142 of the outer bearing housing 102 may be configured to be coupled to a primary fuse structure 170 (FIG. 2) extending between the stiffening ring 142 and the second bearing assembly 101. As will be described below, the primary fuse structure 170 may be configured to fail upon application of an excessive radial load through the structure 170.

In addition, as shown in FIG. 4, the inner bearing support 104 may be configured to be coupled to the mounting race 162 via a pinned connection. Specifically, a plurality of mounting pins 172 may be configured to extend radially between the inner bearing support 104 and the mounting race 162 along the interface defined between such components. In several embodiments, the mounting pins 172 may correspond to shear pins configured to fail when a given shear load is applied at the circumferential interface defined between the inner bearing support 104 and the mounting race 162.

During operation of the gas turbine engine 10, an unbalance within the engine 10 may cause significantly high radial forces to be applied through the fan section 16 of the engine 10 and into the bearing assemblies 100, 101 supporting the rotor assembly 38. If the radial force exceeds a given load threshold, the primary fuse structure 170 may fail (e.g., at a location adjacent to the number one bearing position). Such failure may allow the fan to rotate about a new axis of rotation, thus changing the center of gravity of the rotor shaft 106 and inducing bending loads on the rotor shaft 106 that, in turn, induce a moment load at the bearing assembly 100 located at the number two bearing position. This moment load may act as a shear load on the mounting pins 172 coupled between the inner bearing support 104 and the mounting race 162. If the moment load exceeds a predetermined threshold, the mounting pins 172 may fail, thereby allowing the rotor shaft 106 to pitch about the sliding interface defined between the inner bearing support 104 and mounting race 162 such that the shaft's center of rotation further approaches that of the new rotor center of gravity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing assembly for supporting a rotor shaft relative to a support structure of a gas turbine engine, the bearing assembly comprising:
    a bearing including an outer race and an inner race;
    an outer bearing housing configured to extend radially between the outer race and the support structure of the gas turbine engine; and
    an inner bearing support extending radially between an outer support end configured to be disposed adjacent to the inner race of the bearing and an inner support end configured to be rotatably coupled to the rotor shaft, the inner bearing support including a first spring arm and a second spring arm extending radially between the inner and outer support ends, the inner bearing support further including a stiffening rib separating the first spring arm from the second spring arm such that the first spring arm extends radially outwardly from the stiffening rib towards the outer support end and the second spring arm extends radially inwardly from stiffening rib towards the inner support end.

2. The bearing assembly as claimed in claim 1, wherein the first and second spring arms extend axially relative to the inner and outer support ends such that the stiffening rib is spaced axially from the inner and outer support ends.

3. The bearing assembly as claimed in claim 1, wherein the inner bearing support includes an inner bearing ring disposed at the outer support end, the inner bearing ring being configured to be coupled to the inner race of the bearing.

4. The bearing assembly as claimed in claim 1, wherein the inner bearing support includes a mounting ring disposed at the inner support end, the mounting ring being configured to be rotationally coupled to the rotor shaft via a mounting race.

5. The bearing assembly as claimed in claim 4, wherein the mounting ring is coupled to the mounting race using a plurality of radially extending pins, the pins being configured to fail when a moment load is transmitted through the shaft that exceeds a predetermined load threshold.

6. The bearing assembly as claimed in claim 4, wherein a sliding interface is defined between the mounting ring and the mounting race.

7. The bearing assembly as claimed in claim 1, wherein the outer bearing housing extends radially between an outer housing end configured to be coupled to the support structure and inner housing end configured to be disposed adjacent to the outer race of the bearing, the outer bearing housing including a first housing spring arm and a second housing spring arm extending between the inner and outer housing ends.

8. The bearing assembly as claimed in claim 7, wherein the outer bearing housing further includes a stiffening ring separating the first housing spring arm from the second housing spring arm such that the first housing spring arm extends between the stiffening ring and the outer housing end and the second housing spring arm extends between stiffening ring and the inner housing end.

9. The bearing assembly as claimed in claim 8, wherein the first and second housing spring arms extend axially relative to the inner and outer housing ends such that the stiffening ring is spaced axially from the inner and outer housing ends.

10. The bearing assembly as claimed in claim 7, wherein the outer bearing housing includes a mounting flange disposed at the outer housing end that is configured to be coupled to the support structure and wherein the outer bearing housing includes an outer bearing ring disposed at the inner housing end that is configured to be coupled to the outer race of the bearing.

11. A bearing assembly for supporting a rotor shaft relative to a support structure of a gas turbine engine, the bearing assembly comprising:
    a bearing including an outer race and an inner race;
    an outer bearing housing extending radially from an inner housing end configured to be disposed adjacent to the outer race of the bearing and an outer housing end configured to be coupled to the support structure of the gas turbine, the outer bearing housing including a first spring arm and a second spring arm extending between the inner and outer housing ends, the outer bearing housing further including a stiffening ring separating the first spring arm from the second spring arm such that the first spring arm extends between the stiffening rib and the outer housing end and the second spring arm extends between stiffening rib and the inner housing end; and an inner bearing support configured to extend radially between the inner race of the bearing and the rotor shaft, wherein the inner bearing support extends radially between an outer support end configured to be disposed adjacent to the inner race of the bearing and an inner support end configured to be rotatably coupled to the rotor shaft, the inner bearing support including a first support spring arm, a second support spring arm extending radially between the inner and outer support ends, and a stiffening rib separating the first support spring arm from the second support spring arm such that the first support spring arm extends radially outwardly from the stiffening rib towards the outer support end and the second support spring arm extends radially inwardly from the stiffening rib towards the inner support end.

12. The bearing assembly as claimed in claim 11, wherein the first and second spring arms extend axially relative to the inner and outer housing ends such that the stiffening ring is spaced axially from the inner and outer housing ends.

13. The bearing assembly as claimed in claim 11, wherein the outer bearing housing includes a mounting flange disposed at the outer housing end, the mounting ring being configured to be coupled to the support structure.

14. The bearing assembly as claimed in claim 11, wherein the outer bearing housing includes an outer bearing ring disposed at the inner housing end, the outer bearing ring being configured to be coupled to the outer race of the bearing.

15. The bearing assembly as claimed in claim 11, wherein the first and second support spring arms extend axially relative to the inner and outer support ends such that the stiffening rib is spaced axially from the inner and outer support ends.

16. The bearing assembly as claimed in claim 11, wherein the inner bearing support includes a mounting ring disposed at the inner support end, the mounting ring being configured to be rotationally coupled to the rotor shaft via a mounting race.

17. The bearing assembly as claimed in claim 16, wherein the mounting ring is coupled to the mounting race using a plurality of radially extending pins, the pins being configured to fail when a moment load is transmitted through the shaft that exceeds a predetermined load threshold.

* * * * *